United States Patent Office 3,420,815
Patented Jan. 7, 1969

3,420,815
QUERCETIN AND QUERCETIN GLYCOSIDE
Pierre J. Courbat, Prangins, Vaud, Switzerland, assignor to Zyma S.A., Nyon, Vaud, Switzerland
No Drawing. Filed Oct. 24, 1966, Ser. No. 588,746
Claims priority, applications France, Oct. 25, 1965, 36,051; Switzerland, Mar. 9, 1966, 3,362/66
U.S. Cl. 260—210    12 Claims
Int. Cl. C07d 7/32; C07d 7/24

ABSTRACT OF THE DISCLOSURE

Quercetin derivatives are produced by reacting quercetin or a quercetin glycoside with an epoxy compound such as ethylene oxide in a molar ratio of 1 to 2–20 in at least partially aqueous medium in the presence of an alkaline catalyst at a temperature exceeding 50° C. The products have pharmacological properties and are useful in treating e.g. circulatory disorders.

---

This invention relates to a process for the preparation of one of the mono-, di-, tri-, tetra- and penta-O-($\beta$-hydroxyethyl) derivatives of quercetin or glycosides of quercetin in substantially pure state, or of mixtures of one of these derivatives with that having one additional O-$\beta$-hydroxyethyl group. The hydroxy ethyl groups may include further substituents. It is well understood that quercetin can be hydroxyethylated only at its five phenolic hydroxyl groups, while its glycosides can be hydroxyethylated only at their four phenolic hydroxyl groups.

Known hydroxyethylation processes, for example for rutin, are carried out by means of ethylene chlorohydrin, using stoichiometric quantities of alkali, more particularly caustic soda, or by means of a large excess of ethylene oxide in the presence of an alkali at ambient temperature. These processes result in a mixture of varying complexity containing at least five O-($\beta$-hydroxyethyl) or polyhydroxyethyl rutin derivatives which are very difficult to isolate from one another and purify.

Applicant has now found that reacting one mol of quercetin or one of its glycosides with 2 to 20 moles of an epoxide having the formula

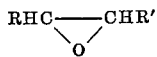

in which R and R′ are hydrogen or an aliphatic, aromatic or araliphatic group, in an at least partially aqueous medium at a temperature above 50° C., preferably between 80 and 90° C., and in the presence of an alkaline catalyst, one obtained with high yields the mono-, di-, tri-, tetra- and penta-O-$\beta$-hydroxyethyl derivatives of quercetin or its glycosides in substantially pure state or admixed with that derivative having an additional O-$\beta$-hydroxyethyl group.

The following are the principal derivatives obtained, depending upon the reaction time: 7-mono-O-($\beta$-hydroxyethyl)-, 7,4′-di-O-($\beta$-hydroxyethyl)-, 7,3′,4′-tri-O-($\beta$-hydroxyethyl)-, 5,7,3′,4′-tetra-O-($\beta$-hydroxyethyl)-, 3,7,3′,4′-tetra-O-($\beta$-hydroxyethyl)-, 3,5,7,3′,4′-penta-O-($\beta$-hydroxyethyl) derivatives of quercetin or, where applicable, their glycosides, or simple mixtures consisting of one of these compounds and the homologous compound having one additional O-($\beta$-hydroxyethyl) group) and one less free hydroxyl group.

The following are examples of quercetin glycosides which may be used: 3-xyloside, 3-glucoside, 3-diglucoside, 3-triglucoside, 3-rhamnoside, 3-rhamodiglucoside, 3-arabinoside, 3-$\alpha$-L-arabofuranoside, 3-$\alpha$-L-arabopyranoside, 3-$\beta$-L-arabinoside, and more particularly the 3-rutinoside, i.e., rutoside.

Preferred examples of the epoxy components are the alkylene oxides and the hydroxyalkylene oxides. More preferred are the oxides of 1,2-propylene, 1,2-butylene, 3-hydroxy-1,2-propylene, 1-phenyl-3-hydroxy-1,2-propylene, styrene, 3-phenoxy-1,2-propylene and most preferred is ethylene oxide.

Quercetin and its various glycosides are substantially insoluble in water and aqueous solvents (0.013% in boiling water), and they form suspensions in aqueous or partially aqueous reaction media. These suspensions gradually pass into solution under the action of the epoxy compound, in the presence of the alkaline catalyst. The speed of solution of the starting material in the reaction medium depends essentially upon the nature of the cation of the alkaline catalyst, and decreases with the following order depending upon the cations of the catalyst present:

The hydroxyethylation reaction can be carried out only in the presence of an alkaline catalyst, such as the hydroxides and carbonates of sodium, potassium, lithium, barium and calcium, the dicarbonates of sodium and potassium, the methylates and ethylates of sodium and potassium, and borax. The catalyst (or a mixture of two or more catalysts) is introduced directly into the reactor in the form of a powder, preferably in finely divided form as a suspension in an aqueous or partially aqueous solvent, or as an aqueous or partially aqueous solution. The proportions of the alkaline catalyst may vary, preferably from 0.025 mole to 0.250 mole, more preferably from 0.050 mole to 0.125 mole per of starting material, depending upon the degree of hydroxyethylation required or upon the speed with which it is required to carry out hydroxyethylation. We have found that although the alkaline catalysts enable hydroxyethylation to be carried out with all of the above reactants, some of them have a more intensive catalytic activity. For example, at equimolecular concentrations, the catalysts may be classified in order of decreasing activity as follows:

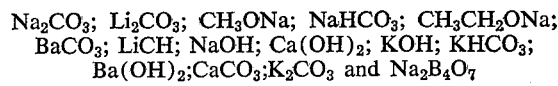

For a given catalyst, the rate of solution of the starting material in the reaction medium increases with increasing proportions of catalyst whilst hydroxyethylation is also promoted as the proportion of catalyst increases. However, care should be taken to avoid the use of an excessive proportion of alkaline catalyst, in order to avoid the conversion of ethylene oxide or its homologues into the corresponding glycols, since this would interfere with extraction and purification of the hydroxy-ether products.

For a given concentration of any of the catalysts, the hydroxyethylation reaction is dependent on time. The reaction time is therefore important in forming the different hydroxyethyl derivatives which pass successively from the mono-substituted to the di-substituted derivatives, the tri-substituted, the tetra-substituted and then, in the case of quercetin, to the penta-substituted derivatives.

The amount of epoxy compound employed may also vary. 2 to 20 mole-equivalents, preferably 4 to 10 mole-equivalents may be used, based upon the quercetin or its glycosides.

The progress of the reaction may be checked either directly by measuring the pH of the reaction solution, since this increases as hydroxyethylation progresses. The progress of the reaction may be followed more accurately by ultraviolet spectrophotometry. Thus in 0.01 N aqueous caustic soda solution the four hydroxyethyl derivatives of rutoside have distinct absorption bands: 384 and 271 nm. (nanometres) in the case of 7-mono-O-($\beta$-hydroxyethyl)-rutoside, 375 and 274 nm. in the case of 7,4′-di-O-($\beta$-hydroxyethyl)-rutoside, 370 and 281 nm. in the case of 7,3,4′-tri-O-($\beta$-hydroxyethyl)-rutoside, and finally 344 and 251 nm. in the case of 5,7,3',4'-tetra-O-(β-hydroxyethyl)-rutoside.

Solvents which may be used include water, aqueous dioxane and aqueous methyl, ethyl, n-propyl and isoproply alcohols. By comparison with reactions carried out in a wholly aqueous medium, reactions which are carried out in a partially aqueous medium have been found to be less rapid.

In a first stage of the process according to the invention, the starting material gradually dissolves, the speed of solution depending mainly upon the temperature, nature and quantity of the alkaline catalyst and upon the rate of introduction of the epoxy compound homologues. Solution of the starting material corresponds with formation of the mono-O-(β-hydroxyethyl) derivatives. As the reaction progresses, the pH of the reaction solution rises and finally reaches a maximum pH corresponding to the formation of the fully substituted O-(β-hydroxyethyl) derivative. If the pH of the reaction medium is plotted against up to the time at which the maximum pH is reached, a number of plateaux are encountered, the first of which corresponds to the formation of the di-O-(β-hydroxyethyl) derivatives, the second to the formation of the tri-O-(β-hydroxyethyl) derivatives, and the third to the formation of the tetra-O-(β-hydroxyethyl) derivatives. Between successive plateaux, the reaction results in the formation of a mixture of mono- and di- and tri-, or tri- and tetra-substituted derivatives, and, in the case of quercetin, tetra- and penta-substituted derivatives respectively. The proportions in which the constituents of these mixtures are present depends upon the time at which the reaction is stopped. The reaction can be terminated at any stage. By approximately combining the various factors which influence the reaction (i.e. the order of substitution of the phenolic hydroxyl groups), vis: nature of the solvent, nature and proportion of the alkaline catalyst, rate of flow of the epoxy compound and the reaction temperature, mono-O-(β-hydroxyethyl), di-O-(β-hydroxyethyl) tri-O-(β - hydroxyethyl), tetra-O-(β - hydroxyethyl) or in the case of quercetin, the penta-O-(β-hydroxyethyl derivatives can be obtained in practically pure form or in the form of simple mixtures with the next higher or lower hydroxyethylated derivative.

To terminate the reaction, it is only necessary to stop the introduction of the epoxy compound and to cool vigorously, since it is practically impossible for the reaction to continue at temperatures below 50° C. Once ambient temperature has been reached, the solution is acidified, preferably to a pH of 4.5. The products may be isolated by known processes, preferably by distilling the reaction liquor under reduced pressure, drying the residue as far as possible, then taking up the residue one or more times in ethanol and recrystallizing from methanol.

The resulting glycosides can then be hydrolyzed to their aglucones by conventional methods, for example by heating under reflux in an aqueous, acid medium.

The quercetin derivatives obtainable by the process according to the invention and their glycosides, have better water-solubility than the aglucones and the latter better water-solubility than the starting materials. Inter alia, they have the following pharmacological properties: they return capillary permeability to normal, increase capillary resistance, and have hemostatic and anti-inflammatory action. They have numerous applications in medicine: for the treatment of disorders of the circulation and capillaries, including inflammation of any kind. They have numerous advantages over known complex mixtures of hydroxyethyl derivatives of quercetin or of its glycosides. Inter alia, they can be incorporated in predetermined and fixed proportions in various pharmaceutical forms.

The following compounds have particular therapeutic utility: 7 - mono-O-(β-hydroxyethyl) - rutoside, 7,4'-di-O-(β-hydroxyethyl)-rutoside, 7,3',4' - tri - O - (β-hydroxyethyl)-rutoside and 5,7,-3',4'-tetra-O-(β-hydroxyethyl)-rutoside, in the practically pure state or in the form of mixtures containing mono- and di-(β-hydroxyethyl)-rutoside or di- and tri-(β - hydroxyethyl)-rutoside: the same applies to 7-mono-O-(β-hydroxyethyl)-quercetin, 7,4'-di-O-(β-hydroxyethyl) - quercertin, 7,3',4'-tri-O-(β-hydroxyethyl)-quercetin, 5,7,3',4' - tetra-O-(β-hydroxyethyl)-quercetin, 3,7,3',4'-tetra - O - (β-hydroxyethyl)-quercetin and, more particularly, 3,5,7,3',4'-penta-O-(β-hydroxyethyl)-quercetin, in the practically pure form or in the form of mixtures containing mono- and di-(hydroxyethyl)-quercetin, or di- and tri(hydroxyethyl)-quercetin, or tri- and tetra-(hydroxyethyl)-quercetin or tetra- and penta-(hydroxyethyl)-quercetin. Quercetin 3-rutoside and ethylene oxide are thus the preferred starting materials.

The invention will now be more particularly described by reference to the following examples.

Example I 10 ml. of 1-N aq. NaOH (i.e. 0.01 mole of NaOH) was added to a suspension of 61 g. (0.1 mole) of quercetin-3-rutoside in 350 ml. of water heated to a temperature of 60° C. The temperature of the mixture was raised to 80–85° C. before the introduction of 20 g. (0.45 mole) of ethylene oxide in a period of 6 hours (rate of flow approximately 30 ml. of ethylene oxide per minute). The rutocide was quantitatively dissolved after 3.25 hours, while after 6 hours the pH of the solution was 9.5. The reactor was then depressurised, the introduction of ethylene oxide was discontinued, the reaction mixture was cooled and the pH was adjusted to 4.5 with hydrochloric acid. After distillation of the liquor the residue was taken up twice in 350 ml. of ethanol from which the product was precipitated by cooling. The reaction product consisting of 7,3',4'-tri-O-(β-hydroxyethyl)-rutocide than recrystallised from methanol and then dried. Corrected M.Pt. 181–182° C. Ultraviolet spectrum in distilled water; two bands at 350 and 254 nm. while in 0.01-N aqueous NaOH these bands are situated at 370 and 281 nm.

Example II

The same experimental conditions as in Example I were used, but 15 ml. of 1-N aqueous NaOH (i.e. 0.015 mole of NaOH) was introduced, and the rutocide dissolved after two hours while after six hours of the reaction 5,7,3', 4' - tetra-O-(β-hydroxyethyl)-rutoside formed, which was isolated and purified as in the previous example. Corrected M.Pt. 182–183° C. The ultraviolet spectra in distilled water and in 0.01-N aqueous NaOH respectively had two identical absorption bands at 344 and 251 nm.

Example III

The same experimental conditions were used as in Example I, but in this case 0.370 g. (0.005 mole) of Li₂CO₃ were introduced as alkaline catalyst. The rutoside was solubilised after about 5 hours and after 6 hours' reaction 7,4' - di-O-(β-hydroxyethyl)-rutoside was formed, which was isolated and recrystallised. Its ultraviolet spectrum in distilled water had two absorption bands at 353 and 255 mm.; while in 0.01-N aqueous NaOH these bands were respectively situated at 373 and 274 nm.

Example IV 10 ml. of 1-N- aqueous NaOH (0.01 mole of NaOH) were introduced at 60° C. into a suspension of 61 g. (0.1 mole) of quercetin-3-rutoside in a mixture of 200 ml. of water and 200 ml. of isopropyl alcohol. The temperature was brought to 750° C. and held for 6 hours, during which approximately 20 g. of ethylene oxide were introduced. The rutoside was totally dissolved after 1.5 hours. At the end of the reaction, after extraction and purification of the product, the latter was found to be 7-mono-O-(β-hydroxyethyl)-rutoside. Ultraviolet absorption in distilled water was at 350 and 254 nm. while in 0.01-N aqueous NaOH these bands were situated at 384 and 271 nm.

Example V

Using the same amounts of reactants as in Example I, but with a reaction time of 7.5 hours, quantitative formation of 5,7,3′,4′-tetra-O-(β-hydroxyethyl)-rutoside was obtained.

Example VI

The procedure of Example II or V was followed and at the end of the reaction time the introduction of ethylene oxide was stopped, 50 ml. of concentrated hydrochloric acid was added and the mixture was heated at reflux for 1.5 hours. By cooling in an ice chamber, 5,7,3′,4′-tetra-O-(β-hydroxyethyl)-quercetin separated and was recrystallised from methanol. Corrected M.Pt. 216–217° C. Ultraviolet absorptions in water: 362 and 252 nm., and in 0.01-N aqueous NaOH: 401 and 262 nm.

Example VII 74.2 g. (0.1 mole) of 7,3′,4′-tri-O-(β-hydroxyethyl)-rutoside were dissolved in 200 ml. of water, 50 ml. of concentrated hydrochloric acid were added and the mixture was heated at reflux for 1.5 hours. During refluxing, 7,3′,4′-tri-O-(β-hydroxyethyl)-quercetin separated and was recrystallised from a water: ethanol (1:1) mixture. Corrected MPt. 212–213° C. Ultraviolet absorptions in water: 370 and 255 nm.; in 0.01-N aqueous NaOH: 408 and 263 nm.

Example VIII 61 g. (0.1 mole) of quercetin-3-rutoside were suspended in 350 ml. of water. The suspension was heated to 50° C. and 12.5 ml. of 1-N aqueous NaOH (0.125 mole) were added and the mixture was heated to 80° C. and held at this temperature for 6 hours, during which 111 g. (1.5 moles) of 3-hydroxyl-1,2-propylene oxide were introduced. The solution was then cooled, acidified to a pH of 4.5, and the liquor was distilled. The residue was precipitated twice from 350 ml. of ethanol, then dissolved in methanol which, when poured into the ethanol, precipitated 5,7,3′,4′-tetra-O-2″,3″ - dihydroxy-1″-propyl-rutoside. The ultraviolet absorption bands in water and 0.01-N aqueous NaOH were identical, being respectively situated at 345 and 251 nm.

Example IX 30 g. of quercetin were suspended in 250 ml. of water. The suspension was heated to 60° C. and 15 ml. of 1-N aqueous NaOH (i.e. 0.015 mole of NaOH) were introduced. At 80° C. a stream of ethylene oxide was introduced and continued for 3 hours. The reaction was then interrupted, the cooled liquor was acidified to pH 4.5. After distillation of the liquor the residue was taken up in 150 ml. of ethanol hot and 3,5,7,3′,4′-penta-O-(β-hydroxyethyl)-quercetin precipitated by cooling and was recrystallised from ethanol. The ultraviolet spectra in water and 0.01-N aqueous NaOH each had two identical bands at 346 and 251 nm.

I claim:
 1. Quercetin derivatives selected from the group consisting of mono-, di-, tri-, tetra- and penta-O-substituted derivatives of quercetin and mono-, di-, tri- and tetra-O-substituted derivatives of quercetin glycosides, a mixture of two adjacent homologous derivatives of quercetin, and a mixture of two adjacent homologous derivatives of quercetin glycosides, wherein in the case of a mono substituted derivative, the substituent is in one of the positions 7,4′ and 3, and in the case of poly substiuted derivatives the substituents are in positions selected from the group consisting of 7,4′; 3′4; 3,7; 3,4′; 7,3′; 4′; 3,7,4′; 3,7,3′; 3,3′,4′; 5,7,3′,4′; 3,7,3′,4′; and 3,5,7,3′,4′; and wherein each substituent of a given compound is the same and is selected from the group consisting of -hydroxyethyl, 2-hydroxy-1-propyl, 2-hydroxy-1-butyl, 2,5-dihydroxy-1-propyl, 2-phenyl-2-hydroxy-1-ethyl, 2,3-dihydroxy-1-phenyl-1-propyl, and 3-phenoxy-2-hydroxy-1-propyl.
 2. A composiiton comprising a mixture of mono-O-β-hydroxyethyl-7-rutoside with di-O-β-hydroxyethyl-7,4′-rutoside.
 3. A composition comprising a mixture of di-O-β-hydroxyethyl-7,4′-rutoside with tri-O-β-hydroxyethyl-7,3′,4′-rutoside.
 4. A composition comprising a mixture of trio-O-β-hydroxyethyl-7,3′,4′-rutoside with tetra-O-β-hydroxyethyl-5,7,3′,4′-rutoside.
 5. Mono-O-β-hydroxyethyl-7-rutoside in substantially pure state.
 6. Di-O-β-hydroxyethyl-7,4′-rutoside in substantially pure state.
 7. Tri-O-β-hydroxyethyl-7,3′,4′-rutoside in substantially pure state.
 8. Tetra-O-β-hydroxyethyl-5,7,3′,4′-rutoside in substantially pure state.
 9. Mono-O-β-hydroxyethyl-7-quercetin in substantially pure state.
 10. Mono-O-β-hydroxyethyl-3-quercetin in substantially pure state.
 11. Mono-O-β-hydroxyethyl-4′-quercetin in substantially pure state.
 12. Di-O-β-hydroxyethyl-7,4′-quercetin in substantially pure state.

References Cited
UNITED STATES PATENTS

| | | | |
|---|---|---|---|
| 3,042,666 | 7/1962 | Gentles | 260—210 |
| 3,167,538 | 1/1965 | Kaiser et al. | 260—210 |

LEWIS GOTTS, *Primary Examiner.*

JOHNNIE R. BROWN, *Assistant Examiner.*

U.S. Cl. X.R.

167—65; 260—345.2; 424—180, 283